June 27, 1944.  E. A. SPRIGG  2,352,571
THICKNESS MEASURING APPARATUS
Filed March 21, 1942
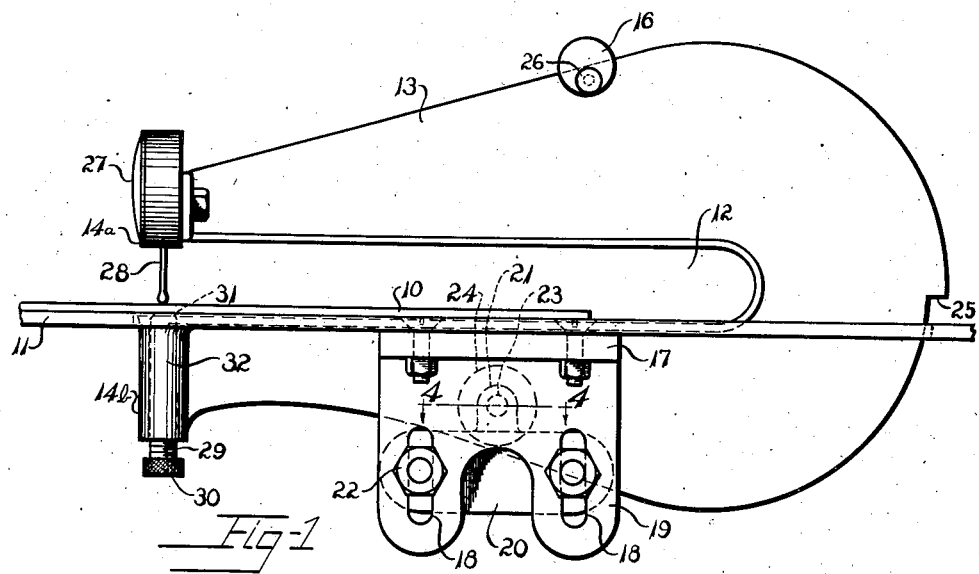
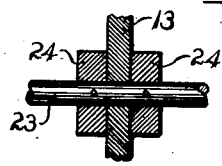
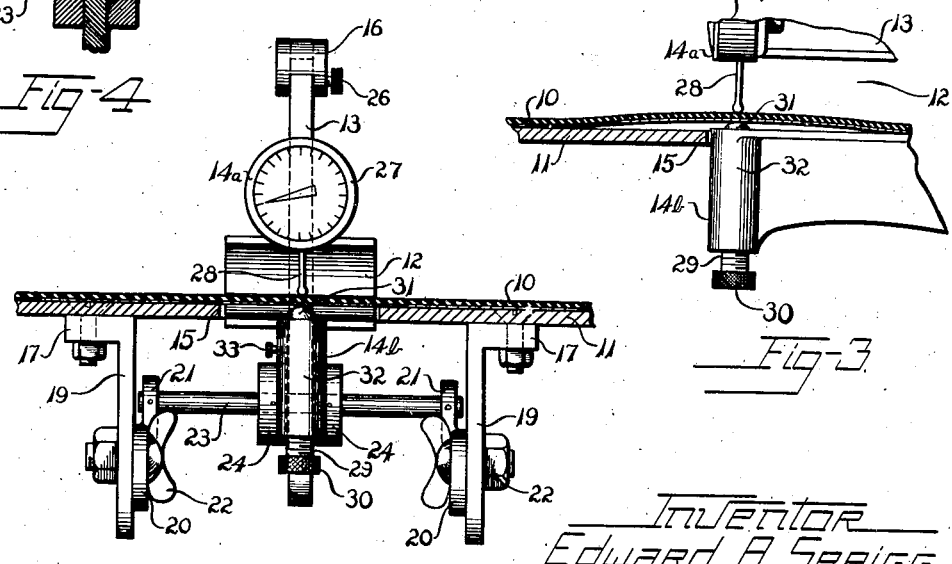
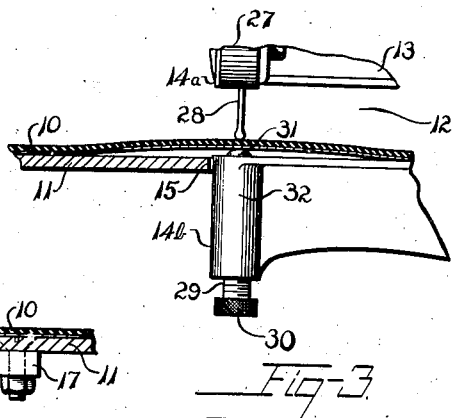
Inventor
Edward A. Sprigg
By Willis F. Avery
Atty.

Patented June 27, 1944

2,352,571

UNITED STATES PATENT OFFICE 2,352,571

THICKNESS-MEASURING APPARATUS

Edward A. Sprigg, Wadsworth, Ohio, assignor to The B. F. Goodrich Company, New York, N. Y., a corporation of New York Application March 21, 1942, Serial No. 435,606

5 Claims. (Cl. 33—147)

This invention relates to apparatus for measuring the thickness of sheet materials and especially sheet materials of considerable length and breadth.

An object of the invention is to provide improved measuring of sheet material and especially to provide apparatus to measure the thickness of sheet material of considerable length and breadth, conveniently and accurately.

Other objects are to provide for measuring the thickness of sheet material effectively despite variations in the surface condition of the sheet material, and to provide for convenience of manufacture and operation of the apparatus.

These and other objects and advantages of the invention will be apparent from the following description.

In the accompanying drawing, which forms a part of this specification, and in which like numerals are employed to designate like parts throughout the same, Fig. 1 is a side elevation of apparatus constructed in accordance with and embodying the invention, parts being broken away, Fig. 2 is a front elevation of the apparatus of Fig. 1, parts being shown in section and broken away, Fig. 3 is a side view of the gauge portion of the apparatus, showing a portion of the supporting table in section, and showing in section sheet material having a surface irregularity, and Fig. 4 is a section taken along line 4—4 of Fig. 1.

The gauging apparatus, constructed in accordance with and embodying the invention, is useful especially to measure the thickness of sheet material which may have temporary bulges in the form of upraised or depressed portions. Gauging means, carried by an unbalanced frame having a pivotal or other suitably movable mounting, is associated with a surface supporting said material in a manner such that the gauging means is movable with respect to said surface, whereby said means is maintained in contact with a face of said material despite the bulged condition of the latter.

In the embodiment of the invention as illustrated in the drawing, the sheet material is shown at 10 supported by a surface 11, said material partially extending into an elongated aperture 12 in a frame 13, for measurement by cooperating elements of a suitable gauging means 14a and 14b, carried by said frame, to indicate the thickness of said material. In accordance with the invention, provision is made whereby a part of the gauge and preferably a part of the frame are moved within the spatial area of an aperture 15 in the surface 11, said surface being supplied as for example by a table-top; and a desirable state of unbalance of said frame is obtained by adjustment of a movable weight 16 mounted on the upper exterior portion of the frame.

Supporting means for the frame 13 may be provided by spaced-apart angle brackets 17 secured to the underside of the table-top 11, each bracket having a plurality of elongated apertures 18 in a downwardly depending leg 19 thereof. Plate members 20 each having an upwardly and inwardly extending projection 21 are attached adjustably through suitable apertures to said brackets by wing bolt and nut fasteners 22. A shaft 23, which is held in place in apertures in said projections 21 and which passes through collars 24 and an aperture in the frame 13, may be positioned within the limits defined by the elongated apertures 18 of the angle brackets 17. Since the frame 13 is pivotally mounted on said shaft 23, it is adjustably positioned likewise with respect to the surface 11 by the adjustment of the shaft 23.

The frame 13, as shown in Figs. 1 and 2, may be a C-member having a T section, the aperture 12 being supplied by the open part of the member, which aperture will accommodate sheet material 10 of considerable length and breadth. Since the frame 13 is journaled on the shaft 23, a stop 25 may be provided to cooperate with the table-top 11 to prevent said frame from pivoting beyond desired limits. The movable balance weight 16 is secured to the upper portion of the frame 13 by a set-screw 26.

Gauging means adapted for measuring the sheet material 10 and comprising elements 14a and 14b in spaced relationship, are mounted on the open end portion of the C-frame 13. The upper element 14a may be a suitable indicating instrument 27 having a feeler member 28, and the lower element 14b may be an adjusting screw 29, having a knurled end 30 and a rounded tip 31, threaded into a cylindrical body end portion 32 of the C-frame 13, the member and tip being adapted to contact the opposite faces of the sheet material to measure its thickness. A set-screw 33 retains the adjusting screw 29 in the desired position.

In Fig. 3 is shown a portion of the open end of the C-frame 13 and the gauging means 14a and 14b. The material 10 having a bulged surface condition, is supported by a table-top 11. Since the C-frame 13 is in a state of unbalance, it pivots about the shaft 23 on which it is journaled, such that said gauging means 14a and 14b contact effectively both faces of the material 10 despite non-conformance of the latter with the plane of the table-top 11.

A pivotal mounting means for the C-frame 13 is shown in Fig. 4. A shaft 23 extends through a suitable aperture in said frame 13 and a collar 24 with pin is mounted upon the shaft 23 in abutting contact with and upon each side of the C-frame 13; thus the frame 13 is held in position but is free to turn as may be required to follow the surface variations of the sheet material 10.

While the thickness-measuring apparatus is applicable to sheet material generally, it is useful especially in determining the thickness of sheet rubber compositions like metal back engraving gum sheet stock. Such sheet stock, usually of considerable length and breadth, may have temporary bulges in the form of upraised or depressed sections at non-uniform spaced intervals over its surface area. This requires that the apparatus be capable of compensating for said surface variations in order to obtain a true measurement of the thickness of such stock at any selected point within the perimeter of same.

In the operation of the apparatus, the metal back engraving gum sheet stock 10, for example, is placed flat upon the table-top 11 and inserted between the feeler member 28 and the adjusting screw tip 31 into the aperture 12 of the C-frame 13; hence the indicating instrument 27 records the sheet thickness at the selected point. The frame 13 having a pivotal mounting, is placed initially in a state of unbalance, by adjusting the weight 16 on its upper leg, such that it tends to swing about the shaft 23; therefore the adjusting screw tip 31 is maintained in contact with the under surface of said stock 10. By means of this follower action, a true thickness measurement may be made anywhere within the confines of said sheet stock regardless of irregularities in the nature of temporary bulges.

Variations may be made without departing from the scope of the invention as it is defined in the following claims.

I claim:

1. Thickness-measuring apparatus comprising a table support for contact with material to be measured, a C-frame having an elongated aperture to accommodate the material, a leg of said frame being below the table support and having a pivotal mounting with respect to said table support and an upper leg of said C-frame being in overlying relation to the table support, an adjustable gauging element carried by the lower leg, a second gauging element carried by the upper leg and having a movable feeler cooperable with the lower gauging element for measuring the material between said elements, said table support having an aperture through which the lower gauging element is movable, and a weight adjustably positioned on the upper leg of the C-frame for adjusting the unbalance of the frame about the pivot whereby the lower gauging element is adapted by virtue of the movability of said C-frame to contact a face of the material despite surface irregularity of the latter.

2. Thickness-measuring apparatus for sheet material comprising a surface for supporting said material freely upon said surface, a C-frame pivotally mounted with respect to said surface at a position intermediate a leg of the C-frame, and spaced-apart gauging means carried by and movable with the C-frame for measuring the sheet material, said means having a first element mounted on one leg and a second element mounted in opposition to the said first element on the other leg of said C-frame at a position spaced from said pivot at one side thereof, the portion of said C-frame at the other side of said pivot being overbalanced with respect to the portion at the first said side, and said second element being adapted by virtue of the movability of said C-frame about its pivot as a result of its unbalanced condition to maintain contact with a face of the material despite surface variation of the latter causing departure from said surface.

3. Thickness-measuring apparatus comprising means including a surface for supporting sheet material freely upon said surface, a frame pivotally mounted with respect to the supporting means and said material in an unbalanced condition about the pivot and having a pair of spaced-apart legs for accommodating the sheet material, one of said legs being below said supporting means in a relation to be urged upward toward said material by the unbalanced condition of said frame and the other leg being in overlying relation to said supporting means, an adjustable gauging element carried by one of said legs, a second gauging element carried by the other leg and having a movable feeler cooperable with the first said gauging element for measuring the sheet material between said elements, said supporting means having an aperture through which one of said gauging elements is movable under the urging by the unbalanced frame, and means adjustably positioned on one of said legs for adjusting the unbalance of the frame about the pivot whereby the adjustable gauging element is adapted by virtue of the movability of said frame about its pivot to maintain contact with a face of the sheet material despite surface irregularity of the latter in its freely supported condition causing departure from said supporting means.

4. Thickness-measuring apparatus comprising a surface for freely supporting upon it the material to be measured, gauging means, and a frame pivotally mounted with respect to said support, said gauging means being carried by and movable with said frame, said frame comprising a gauge-carrying portion extending from the pivot and an overbalancing portion extending in another direction from the pivot for urging the first said portion and said gauging means toward the material by the force of the unbalanced condition of said frame to measure the material without requiring precise conformance of the material with said surface in its freely supported condition upon said surface.

5. Thickness-measuring apparatus comprising a surface for freely supporting upon it the material to be measured, gauging means, a frame pivotally mounted with respect to said support, said gauging means being carried by and movable with said frame, said frame comprising a gauge-carrying portion extending from the pivot and an overbalancing portion extending in another direction from the pivot for urging the first said portion and said gauging means toward the material by the force of the unbalanced condition of said frame to measure the material without requiring precise conformance of the material with said surface in its freely supported condition upon said surface, and means for adjusting the amount of overbalance of said overbalancing portion.

EDWARD A. SPRIGG.